Nov. 30, 1954    H. S. INDGE    2,695,479
LAPPING MACHINE
Filed Feb. 24, 1954    2 Sheets-Sheet 1

INVENTOR.
HERBERT S. INDGE
BY
Harold W. Eaton
ATTORNEY

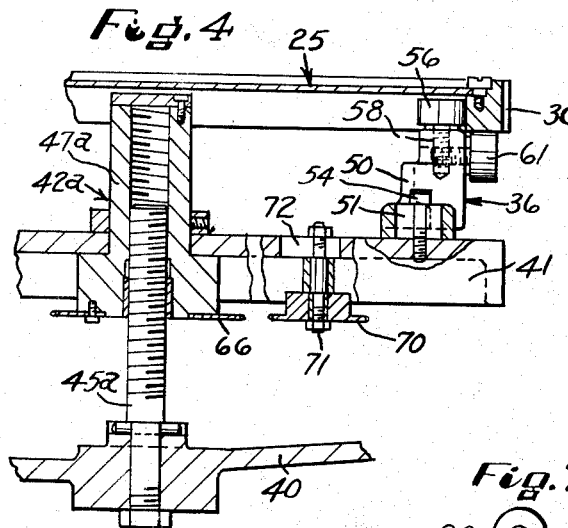
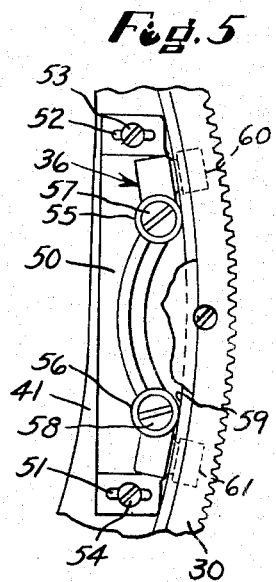
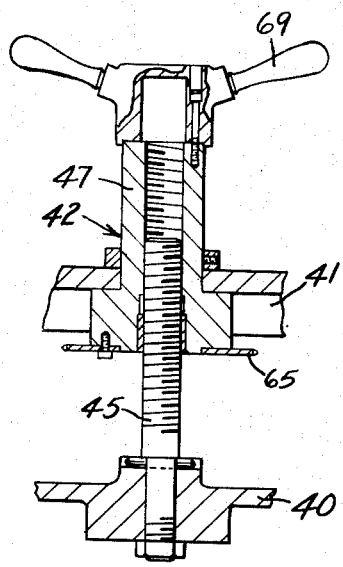
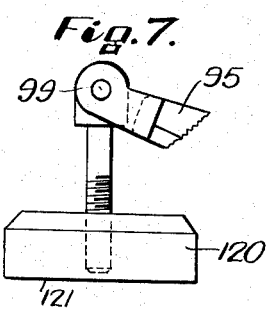
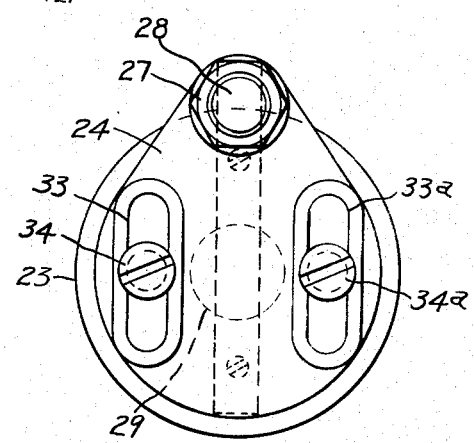

United States Patent Office 2,695,479
Patented Nov. 30, 1954

2,695,479

LAPPING MACHINE

Herbert S. Indge, Westboro, Mass., assignor to Norton Company, Worcester, Mass., a corporation of Massachusetts Application February 24, 1954, Serial No. 412,184

7 Claims. (Cl. 51—131)

The invention relates to lapping machines, and more particularly to a machine for simultaneously lapping a plane face on a plurality of work pieces.

One object of the invention is to provide a simple and thoroughly practical lapping machine for simultaneously lapping a plane face on a plurality of work pieces. Another object is to provide a lapping machine with a work cage which is supported by a plurality of symmetrically arranged rollers. Another object is to provide an adjusting mechanism for adjusting the plane of rotation of work cage relative to the operative face of the lapping wheel. Another object is to provide a nut and screw mechanism for vertically adjusting the position of the work carrying cage. Another object is to provide a plurality of symmetrically arranged nut and screw mechanisms to facilitate adjusting the plane of rotation of the work cage. A further object is to provide a manually operable synchronously driving mechanism to facilitate a simultaneous adjustment of each of the nut and screw mechanisms.

Another object is to provide a work cage having a plurality of work receiving apertures and to provide a pivotally mounted deformable weight mechanism associated therewith to facilitate maintaining work pieces having irregular upper surfaces in lapping engagement with the lapping wheel at the desired pressure. Another object is to provide an adjustably mounted cam to facilitate automatically raising said weights for an unloading and loading operation. Other objects will be in part obvious or in part pointed out hereinafter.

In the accompanying drawings, in which is shown one of various possible embodiments of the mechanical features of this invention, Fig. 1 is a side elevation of the lapping machine, having parts broken away and shown in section to illustrate the operating mechanisms of the machine;

Fig. 3 is a fragmentary vertical sectional view, on an enlarged scale, taken approximately on the line 3—3 of Fig. 2, of the actuating mechanism for vertically adjusting the position of the work cage;

Fig. 4 is a fragmentary vertical sectional view on an enlarged scale, taken approximately on the line 4—4 of Fig. 2, through one of the vertical cage adjusting units, showing one of the sets of rollers for supporting the work cage;

Fig. 5 is a fragmentary plan view, on an enlarged scale, of one of the sets of rollers for rotatably supporting the work cage;

Fig. 6 is a fragmentary plan view, on an enlarged scale, of the center support for the work cage; and Fig. 7 is a detail view of a modified form of the work engaging weight.

Figures 1, 2:
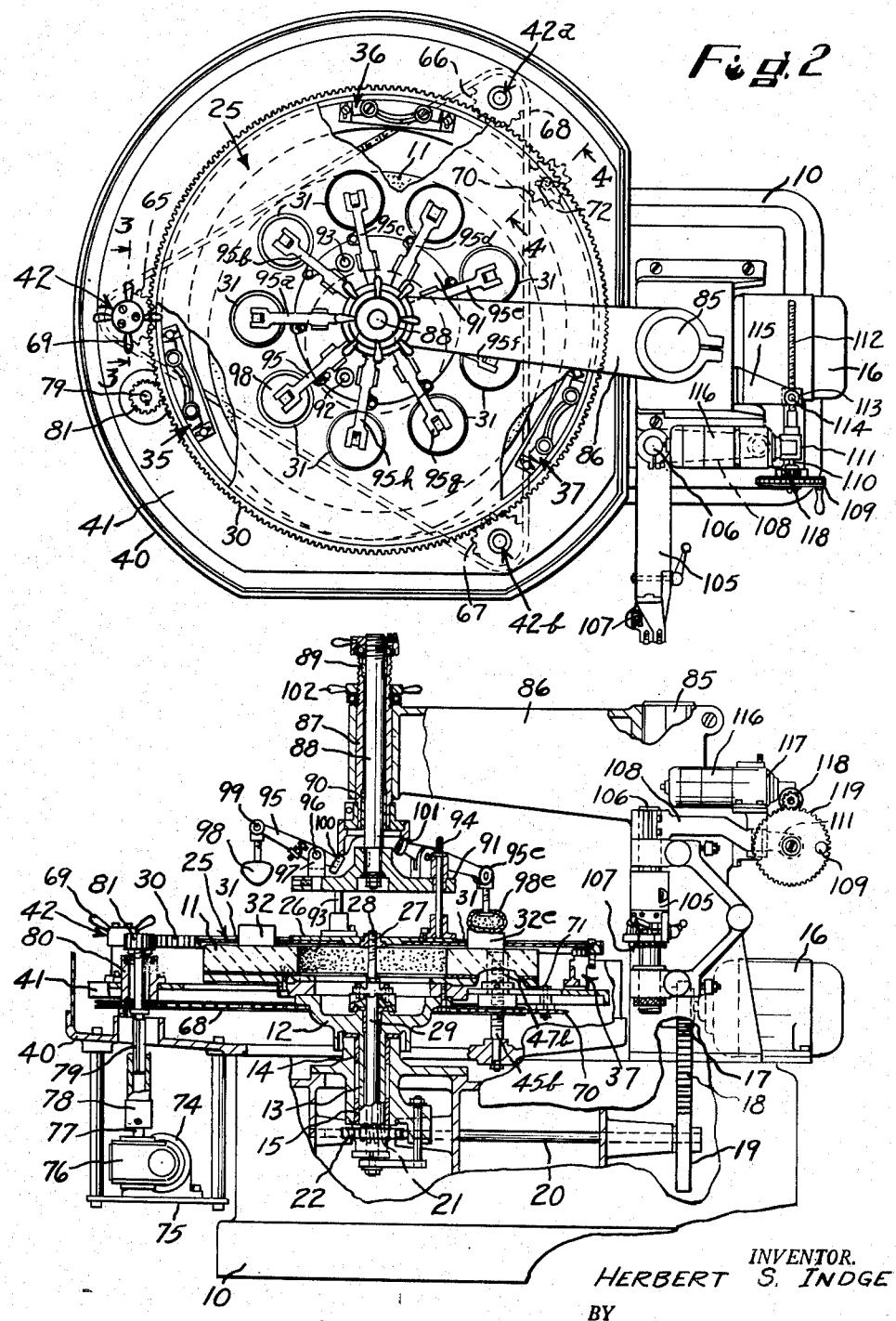
Fig. 2 is a plan view of the lapping machine.

A lapping machine has been illustrated in the drawings comprising a base 10 which supports a lapping wheel 11 having a plane operative horizontally arranged lapping surface. The lapping wheel 11 is supported on a flanged plate 12 which is fixedly mounted on or formed integral with a vertically arranged driving sleeve 13. The sleeve 13 is rotatably supported in bearings 14 and 15 which are fixed relative to the base 10.

A suitable driving mechanism is provided for rotating the lapping wheel 11 at a predetermined lapping speed. This mechanism may comprise a motor 16 having a sprocket 17 mounted on its shaft. The sprocket 17 is connected by a link chain 18 with a sprocket 19 mounted on the right hand end of a rotatable shaft 20 which is journalled in suitable bearings carried by the base 10. The shaft 20 is provided with a worm 21 which meshes with a worm gear 22 fixedly mounted on the lower end of the sleeve 13. It will be readily apparent from the foregoing disclosure that the motor 16 when started will impart a rotary motion to the lapping wheel 11, through the mechanism above described.

The work pieces to be lapped are supported by a disc shaped work cage 25 which is fixedly mounted to a central plate 26. The central plate 26 is supported for rotation by a flange on a bushing 27 which is threaded onto a stud 28 which is carried by a vertically arranged non-rotatable shaft 29. The stud 28 is adjustably mounted on the upper end of the shaft 29 and arranged so that its axis may be adjusted and positioned offset or eccentric relative to the axis of the shaft 29. The upper end of the shaft 29 is provided with an enlarged head 23 which supports a transversely adjustable plate 24. The plate 24 is provided with a pair of spaced elongated slots 33 and 33a. Clamping screws 34 and 34a pass through the elongated slots 33 and 33a respectively and are screw threaded into the head 23. The plate 24 carries the stud 28. It will be readily apparent from the foregoing disclosure that by loosening the clamping screws 34 and 34a, the plate 24 may be adjusted transversely relative to the head 23 to vary the offset position of the stud 28 relative to the axis of the shaft 29 thereby varying the eccentricity of work cage 25 relative to the operative face of the lapping wheel 11.

The work cage 25 is supported on its periphery by an annular ring-type gear 30. The work cage 25 is provided with a plurality of work receiving apertures 31 for supporting a plurality of work pieces 32 to be simultaneously lapped on the opposite face of the lapping wheel 11.

A suitable adjusting mechanism is provided for adjusting the position of the cage 25 vertically to position it in the desired relationship with the operative face of the lapping wheel 11. The ring gear 30 is rotatably supported by a plurality of cage supporting roller assemblies 35, 36 and 37. A pan shaped member 40 is fixedly mounted on the base 10 and is arranged to support an annular ring-shaped platen 41 on a plurality of symmetrically arranged vertical adjustable supporting units 42, 42a and 42b only two of which have been shown in detail. The pan 40 supports a plurality of non-rotatable vertically arranged screws 45, 45a and 45b which are arranged in a manner to be hereinafter described to adjustably support the platen 41. The platen 41 is provided with a plurality of rotatable nuts 47, 47a and 47b which mesh with or engage the screws 45, 45a and 45b respectively.

Each of the cage supporting roller assemblies are identical in construction, consequently only one of these units has been illustrated in detail. The roller assembly units 35, 36 and 37 each comprise a bracket 50 which is provided with a pair of spaced elongated slots 51 and 52 (Fig. 5). A pair of clamping screws 53 and 54 pass through the elongated slots 51 and 52 respectively and are screw threaded into the platen 41. It will be readily apparent from the foregoing disclosure that the bracket 50 may be adjusted relative to the platen for positioning the assemblies in the desired position. Each of the brackets 50 is provided with a pair of vertically arranged rollers 55 and 56 which are supported on vertically arranged studs 57 and 58 respectively. The rollers 55 and 56 are arranged to engage an internal cylindrical surface 59 formed on the gear 30 to facilitate guiding the ring gear 30 and the work cage 25 during rotation thereof about the axis of the stud 28. The rollers 55 and 56 serve also to take up the thrust of the cage driving mechanism to be hereinafter described. Each of the brackets 50 is also provided with a pair of spaced horizontally arranged rollers 60 and 61 which are arranged to rotate about horizontally arranged studs (not shown) carried by the brackets 50 to determine the plane of the cage 25 and the supporting ring gear 30.

The vertically adjustable supporting units 42, 42a and 42b serve to facilitate vertically adjusting the position of the work cage 25 relative to the lapping wheel 11.

A suitable driving mechanism is provided for synchronously rotating the nuts 47, 47a and 47b to cause a vertical adjustment of the platen 41 and the work cage 25. This mechanism may comprise a chain drive including a plurality of sprockets 65, 66 and 67, fixedly mounted on the nuts 47, 47a and 47b respectively, which are surrounded by a link chain 68. A manually adjustable hand wheel 69 is fixedly mounted on the upper portion of the nut 47. By rotating the hand wheel 69, a rotary motion will be imparted to the nut 47 and through the link chain mechanism above described to the nuts 47a and 47b to cause a vertical adjusting movement to be imparted to the platen 41 thereby adjusting the position of the cage 25 relative to the lapping wheel 11. An idler sprocket 70 is provided for taking up the slack in the link chain 68. The idler sprocket 70 is supported by a stud 71 which passes through an elongated slot 72 formed in the platen 41. It will be readily apparent from the foregoing disclosure that by adjusting the position of the stud 71 within the elongated slot 72, the sprocket 70 may be adjusted as desired.

A suitable driving mechanism is provided for the work cage 25 comprising a motor 74 which is mounted on a motor supporting plate 75 fastened to the underside of the pan 40. The motor is connected to drive a speed reducer unit 76 which is provided with a vertically arranged driven shaft 77. The shaft 77 is provided with a hollow sleeve 78 which is splined to the lower end of a rotatable shaft 79 journalled in suitable bearings in a sleeve 80 which is fixedly mounted to the platen 41. The lower end of the shaft 79 telescopes within the sleeve 78 so as to facilitate imparting a driving connection in any position of the platen 41. The upper end of the shaft 79 is provided with a gear 81 which meshes with the ring gear 30. When it is desired to rotate the cage 25, the motor 74 is started which imparts a rotary motion through the mechanism above described to rotate the gear 81 and thereby rotate the ring gear 30 to impart a rotary motion to the cage 25 so as to carry the work piece 32 in a desired path relative to the operative face of the lapping wheel 11.

This machine is particularly adapted for lapping a plane surface on a work piece which may be irregular in shape such as shown in Fig. 1. In order to produce the desired lapping action a suitable mechanism is provided for maintaining the work piece being lapped in engagement with the operative face of the lapping wheel 11 at the desired pressure. The base 10 is provided with a vertically arranged column 85 which serves as a support for a horizontally extending arm 86. The arm 86 supports a vertically arranged sleeve 87. A vertically arranged shaft 88 is rotatably journalled in bearings 89 and 90 within the sleeve 87. The lower end of the shaft 88 is provided with a flanged plate 91 which is connected by a plurality of vertically arranged rods 92, 93 and 94 with the central portion 26 of the work cage 11. The rods 92, 93 and 94 are fixedly mounted on the central plate 26 so that a rotary motion of the cage 11 and the plate 26 will impart a corresponding rotary motion to the plate 91 and the shaft 88. The plate 91 serves as a support for a plurality of pressure devices for maintaining the desired pressure of the work piece on the lapping wheel 11 during a lapping operation. These pressure devices may comprise a plurality of pivotally mounted arms 95, 95a, 95b, 95c, 95d, 95e, 95f, 95g and 95h. These arms are identical in construction consequently only one of the units will be described in detail. The arm 95 is pivotally supported by a stud 96 carried by an upwardly projecting boss 97 fixed on the plate 91. The outer end of the arm 95 is connected to a deformable weighted member 98 by means of a stud 99. The weighted member 98 may be formed of a flexible fabric container which is filled with lead shot so that when the arm 95 is swung in a counter-clockwise direction, the deformable weighted member 98 will engage the upper surface of the work piece to be lapped. Due to the deformable weighted member the pressure on the work piece will be uniformly distributed even though the upper surface of the work piece is irregular in shape such as shown at 32e.

In order to load work pieces into the machine, it is desirable to provide a suitable mechanism for raising the weighted elements 98 after the work pieces have been lapped through one complete rotation of the cage 11 without the necessity of stopping the lapping wheel or the rotary motion of the work cage 25. The inner ends of the arms 95 are preferably provided with follower rollers 100 which are arranged to engage a cam 101 which is adjustably clamped onto the lower end of the sleeve 87. The sleeve 87 is slidably keyed within the outer end portion of the arm 86. The upper end portion of the sleeve 87 is screw threaded. A hand wheel 102 meshing with said threaded portion of the sleeve 87 serves to facilitate vertically adjusting the sleeve 87 relative to the arm 86 so as to vary the position of the cam 101. This adjustment serves to facilitate setting-up the machine for lapping work pieces of different sizes.

As the cage 25 is rotated during a lapping operation, the plate 91 rotates synchronously therewith. As the work piece 32 approaches the position shown at the left hand portion of Fig. 1, the high point on the cam 101 through the roller 100 rocks the arm 95 in a clockwise direction (Fig. 1) to raise the deformable weighted member 98 from engagement with the work piece 32 so as to facilitate removing the lapped work piece and inserting a new piece to be lapped there instead. As the roller 100 revolves from the high point of the cam 101, the arm 95 due to the weight of the deformable weighted member 98 rocks in a counter-clockwise direction into engagement with the upper surface of the work piece 32 into an operative position 98e as shown in Fig. 1. The deformable weighted members 98e remain in operative engagement with the work piece to be lapped during substantially one complete rotation of the cage 11. The weight is removed momentarily from engagement with the work piece 32 merely to facilitate a loading operation.

The work cage 25 is positioned to rotate about an axis eccentric to the axis of rotation of the lapping wheel 11 so that the work pieces being lapped travel across the operative face of the lapping wheel during a revolution thereon.

A lap truing apparatus is provided comprising an arm 105 which is supported by a vertically arranged rock shaft 106. A truing tool 107 is adjustably mounted adjacent to the end of the arm 105. A second arm 108 is fixedly mounted on the rock shaft 106 and arranged to move in an arcuate path with the arm 105. A manually operable feed wheel 109 is mounted on a rotatable shaft 110 which is journalled in a bearing 111 fixedly mounted on the right hand end of the arm 108 (Fig. 2). A feed screw 112 is formed integral with the shaft 110. The feed screw meshes with or engages a nut 113 pivotally supported by a stud 114 carried by a bracket 115 which is fixedly mounted on the column 85 of the machine. It will be readily apparent from the foregoing disclosure that a rotary motion of the hand wheel 109 will impart a swinging motion to the arms 108 and 105 to swing the truing tool 107 in an arcuate path across the plane operative face of the lapping wheel 11. If desired, a motor driven mechanism may be provided for swinging the truing tool by power. This mechanism may comprise a motor 116 which drives through an integral speed reducer unit 117 to rotate a small gear 118 which meshes with gear teeth 119 formed on the periphery of the feed wheel 109. The motor 116 is preferably a reversible motor so that the feed screw may be rotated in either direction to traverse the truing tool 107 in an arcuate path in either direction at a slow control rate for truing the face of the lap.

The operation of this improved lapping machine will be readily apparent from the foregoing disclosure. Work pieces 32 to be lapped are inserted in cage apertures 31 in the position illustrated at the left hand portion of Fig. 1. The motor 16 is set in motion to impart a rotary motion to the lapping wheel 11. The motor 74 is started to impart a rotary motion to the work cage 25 so that the work cage will revolve the work pieces to be lapped in an eccentric path on the operative face of the lapping wheel. As soon as the roller 100 rides off the high point on the cam 101, the arm 95 swings in a counter-clockwise direction under the influence of gravity due to the deformable weight 98 which engages the upper surface of the work piece to maintain the work piece in operative engagement with the lapping wheel at the desired and predetermined pressure. The work piece revolves slightly less than 360° after which the deformable weight is again raised to facilitate removing the lapped work piece and inserting a new work piece therein. The work pieces are removed from and loaded into the machine without the necessity of stopping either the cage or the lapping wheel. The cage apertures 31 are shown as circular apertures slightly larger in diameter than the diameter of the work pieces 32. The cage apertures may be of a different size and shape, depending upon the size and shape of the work pieces to be lapped. For lapping regularly shaped work pieces having substantially flat top surfaces, the deformable weighted members 98 may be replaced with solid cylindrically shaped weights 120 (Fig. 7) having plane work engaging surfaces 121.

It will thus be seen that there has been provided by this invention apparatus in which the objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a lapping machine having a base, a vertically arranged hollow spindle thereon, a lapping wheel having a plane operative face mounted on the upper end of said spindle, a motor on said base, driving connections interposed between the motor and spindle to rotate the lapping wheel at a predetermined lapping speed, a work cage having a plurality of work receiving apertures therein, a ring gear to support the outer periphery of said cage, means including a plurality of anti-friction rollers to support said ring gear for rotation, and means including a nut and screw mechanism to adjust the position of said rollers to adjust the plane of rotation of the cage relative to the opposite face of the lapping wheel.

2. In a lapping machine having a base, a vertically arranged rotatable hollow spindle thereon, a lapping wheel having a plane operative face mounted on the upper end of said spindle, a motor on said base, driving connections interposed between the motor and spindle to rotate the lapping wheel at a predetermined lapping speed, a rotatable work cage having a plurality of work receiving apertures therein located adjacent to and above the operative face of the lapping wheel, a ring gear to support the periphery of said cage, a plurality of symmetrically arranged rollers to support said ring gear and cage, an annular platen to support said rollers, and means including a nut and screw adjusting mechanism interposed between the base and platen to facilitate adjusting the position of said platen so as to vary the position of the cage relative to the operative face of the lapping wheel.

3. In a lapping machine having a base, a vertically arranged rotatable hollow spindle, a lapping wheel having a plane operative face mounted on the upper end of said spindle, a motor on said base, driving connections interposed between the motor and spindle to rotate the lapping wheel at a predetermined lapping speed, a work cage having a plurality of work receiving apertures therein, a ring gear to support the outer periphery of said cage, a plurality of symmetrically arranged rollers to support said ring gear and cage to determine the plane of rotation of the cage, and means including a plurality of symmetrically arranged synchronously actuated adjusting mechanisms interposed between the base and rollers to facilitate a vertical adjustment of the cage relative to the lapping wheel.

4. In a lapping machine having a base, a vertically arranged rotatable hollow spindle thereon, a lapping wheel having a plane operative face mounted on the upper end of said spindle, a motor on said base, driving connections interposed between the motor and spindle to rotate the lapping wheel at a predetermined lapping speed, a work cage having a plurality of work receiving apertures therein which is located adjacent to the operative face of the lapping wheel, a gear on the periphery of said cage, a plurality of sets of symmetrically arranged rollers to engage said gear, a pair of rollers in each set serving to determine the plane of rotation of said cage, an independent pair of rollers in each set serving to determine the axis of rotation of said cage eccentric to the axis of rotation of the lapping wheel, and means including a plurality of synchronously adjusted vertically arranged nut and screw mechanisms interposed between the base and each set of rollers to facilitate a vertical adjustment of the cage relative to the lapping wheel.

5. In a lapping machine having a base, a vertically arranged rotatable spindle thereon, a lapping wheel having a plane operative face mounted on the upper end of said spindle, a motor on said base, driving connections interposed between the motor and spindle to rotate the lapping wheel at a predetermined lapping speed, a work cage having a plurality of work receiving apertures therein, a ring gear on the periphery of said cage, a plurality of sets of symmetrically arranged rollers to engage said gear, a pair of rollers in each set serving to determine the plane of rotation of the cage, an independent pair of rollers in each set serving to determine the axis of rotation of the cage eccentric to the axis of rotation of the lapping wheel, an annular platen to support said sets of rollers, and means including a plurality of symmetrically arranged synchronously adjusted vertically arranged nut and screw mechanisms interposed between the base and platen to facilitate a vertical adjustment of the rollers and cage for positioning the cage relative to the operative face of the lapping wheel.

6. In a lapping machine, as claimed in claim 1, in combination with the parts and features therein specified of a rotatable platen above said cage having its axis aligned with the axis of rotation of the cage, driving connections between said cage and platen synchronously to rotate the platen with the cage, a plurality of pivotally mounted arms on said platen, a work engaging weight on one end of each of said arms, said arms and weights being positioned to engage a work piece in each of the cage apertures, said weights serving to maintain work pieces in lapping engagement with the lapping wheel at predetermined pressures, a roller on the other end of each of said arms, and a stationary cam in the path of said rollers which is arranged during each rotation of the cage successively to raise one or more of said weights to facilitate a loading operation.

7. In a lapping machine, as claimed in claim 1, in combination with the parts and features therein specified of a rotatable platen above said cage, driving connections between said cage and platen synchronously to rotate the platen with the cage, a plurality of pivotally mounted arms on said platen, a deformable work engaging weight on one end of each of said arms, said weights being positioned to engage a work piece in each of said apertures, said deformable weights serving to maintain irregularly shaped work pieces in lapping engagement with the lapping wheel at predetermined pressures during a lapping operation, a roller on the other end of each of said arms, and an adjustably mounted stationary cam in the path of said rollers which is arranged during each rotation of the cage successively to raise said weights to facilitate a work loading operation.

References Cited in the file of this patent

UNITED STATES PATENTS

| Number | Name | Date |
|---|---|---|
| 387,482 | Ball | Aug. 7, 1888 |
| 1,262,529 | Lowe | Apr. 9, 1918 |
| 1,509,823 | Blood | Sept. 30, 1924 |
| 1,541,001 | Searles | June 9, 1925 |
| 1,551,156 | Johnson | Aug. 25, 1925 |
| 1,610,984 | Van Keuren | Dec. 14, 1926 |
| 2,142,057 | Hulbert et al. | Dec. 27, 1938 |
| 2,581,106 | Indge | Jan. 1, 1952 |
| 2,627,144 | Roshong | Feb. 3, 1953 |